Figure 1:
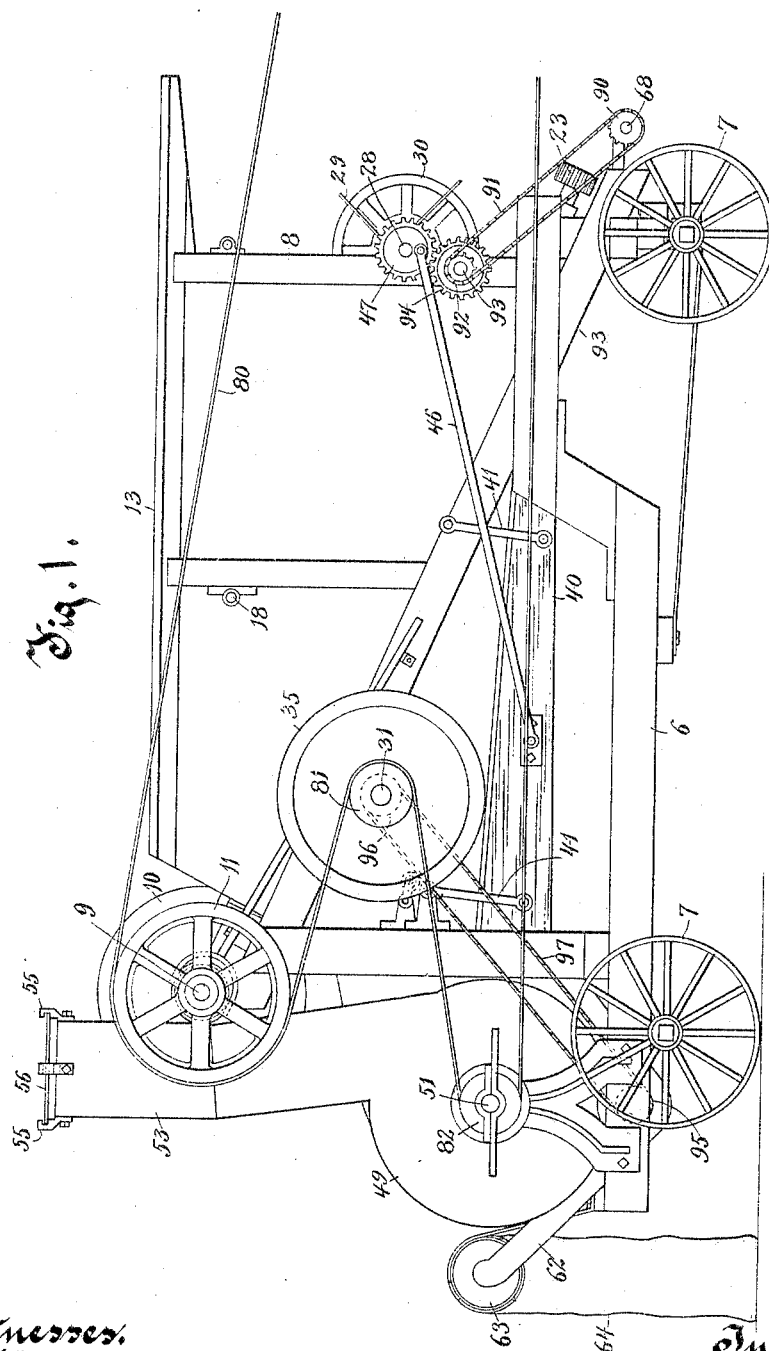

No. 777,047. PATENTED DEC. 6, 1904.
A. ROSENTHAL.
CORN HUSKING AND SHREDDING MACHINE.
APPLICATION FILED APR. 7, 1903.
NO MODEL. 4 SHEETS—SHEET 1.

Witnesses.
O. H. Keeney,
Anna F. Schmidtbauer.

Inventor.
August Rosenthal.
By Benedict, Morsell & Green.
Attorneys.

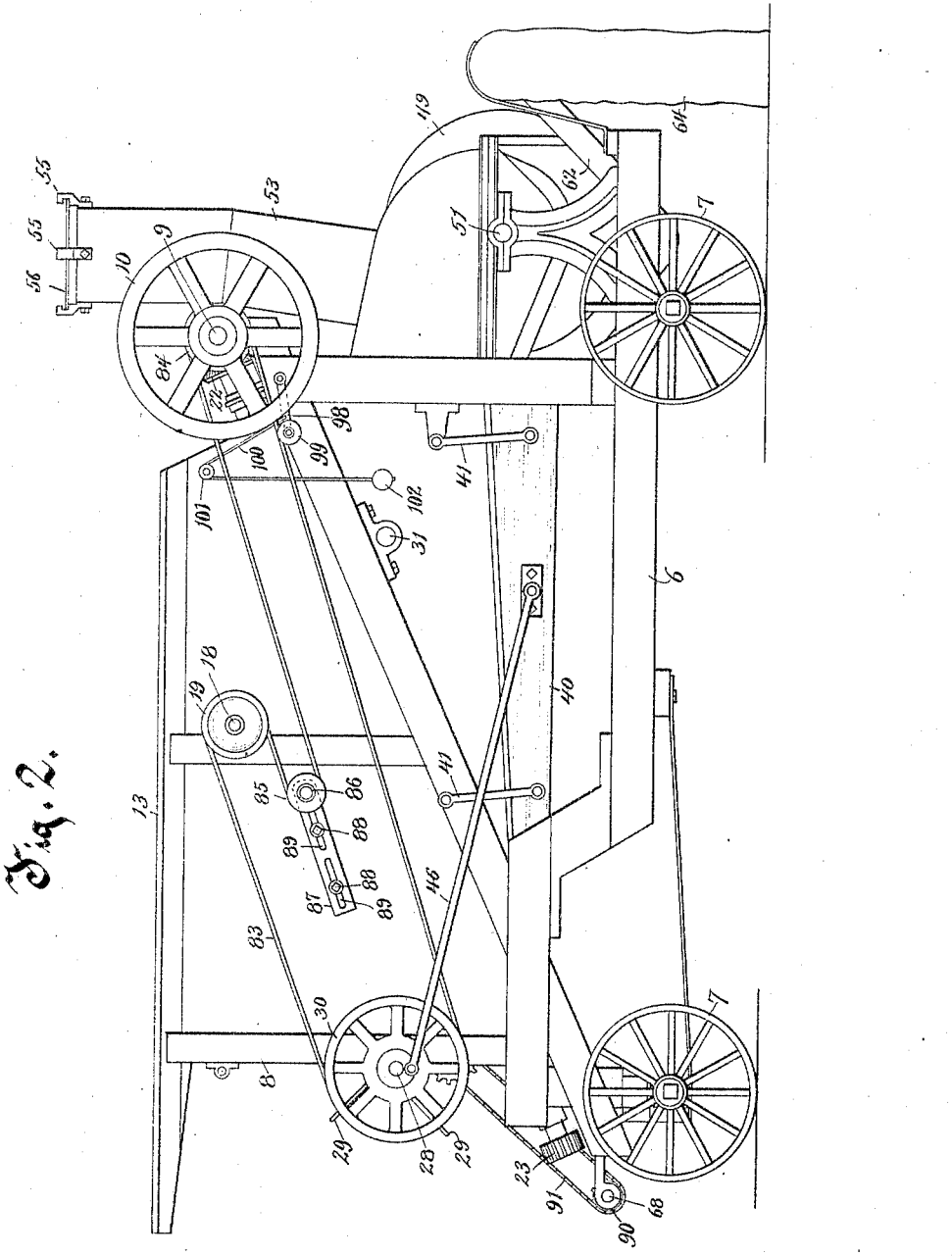

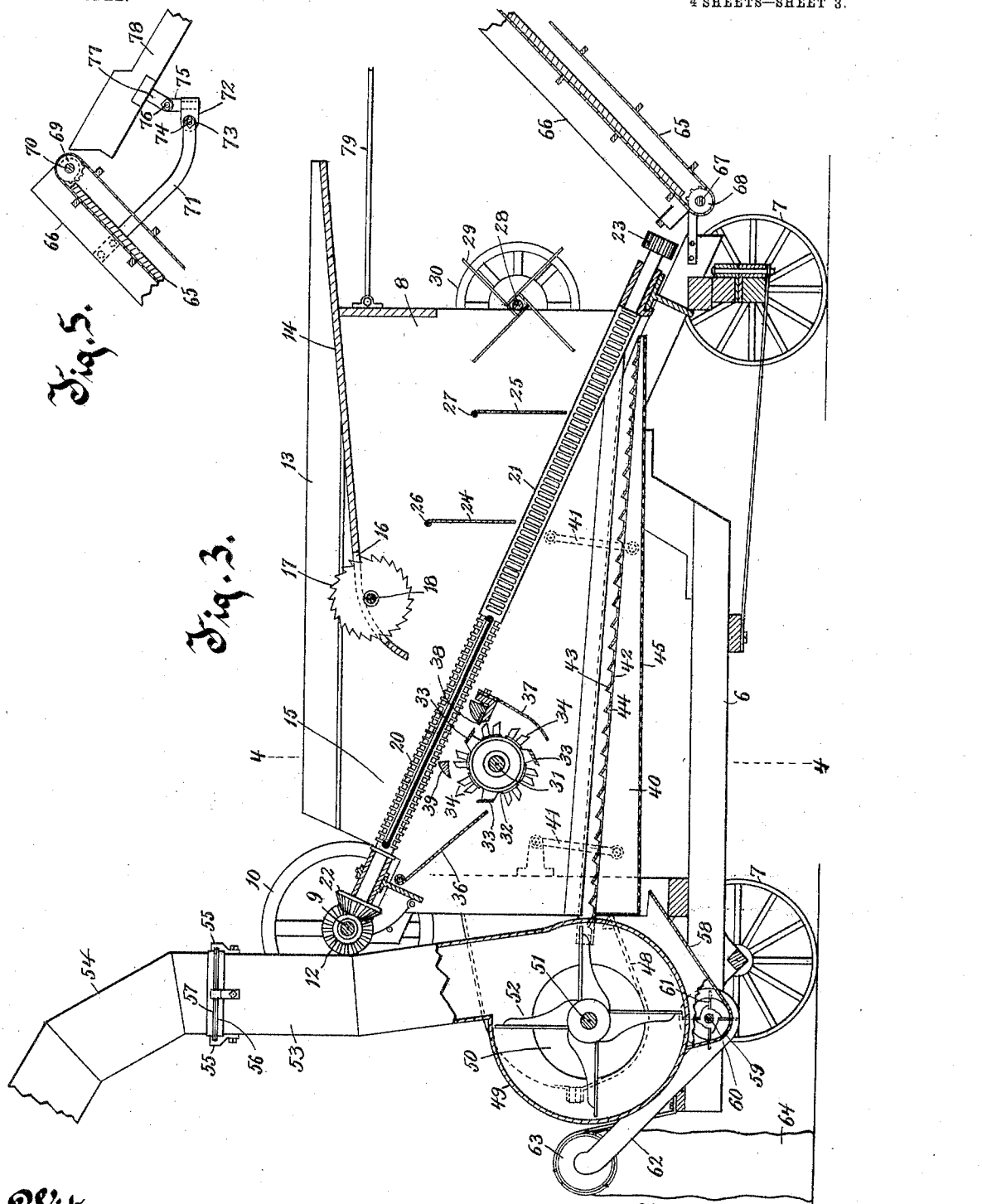

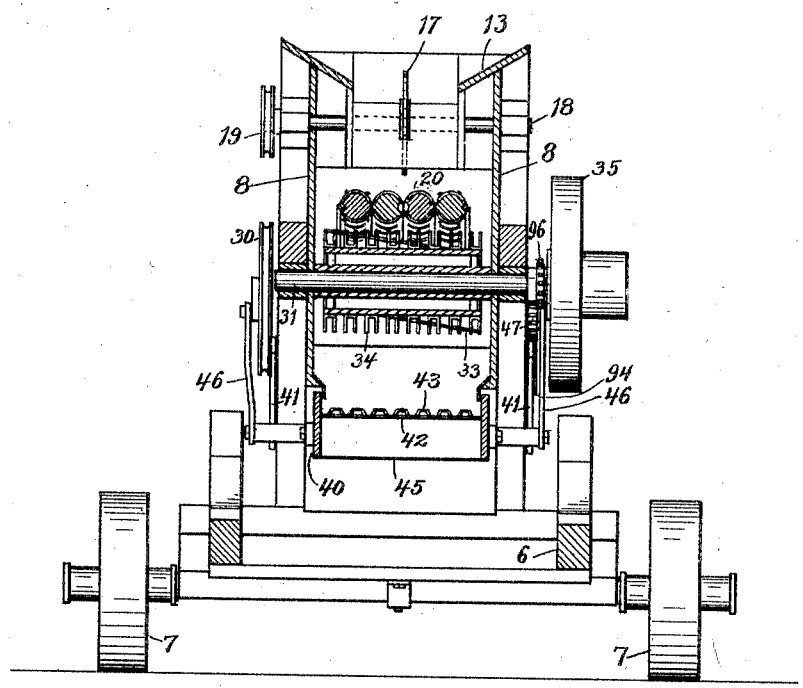

No. 777,047.

Patented December 6, 1904.

UNITED STATES PATENT OFFICE.

AUGUST ROSENTHAL, OF MILWAUKEE, WISCONSIN, ASSIGNOR TO ROSENTHAL MANUFACTURING COMPANY, OF MILWAUKEE, WISCONSIN.

CORN HUSKING AND SHREDDING MACHINE.

SPECIFICATION forming part of Letters Patent No. 777,047, dated December 6, 1904.

Application filed April 7, 1903. Serial No. 151,460. (No model.)

*To all whom it may concern:*

Be it known that I, AUGUST ROSENTHAL, residing at Milwaukee, in the county of Milwaukee and State of Wisconsin, have invented a new and useful Improvement in Corn Husking and Shredding Machines, of which the following is a description, reference being had to the accompanying drawings, which are a part of this specification.

My invention has relation to improvements in corn husking and shredding machines.

The primary object of the invention is to provide for simplicity of construction and arrangement of parts, whereby the machine as a whole is simplified and cheapened.

A further object is the provision of improved means whereby any shelled kernels of corn which may pass between and below the husking-rolls in the travel of the ears along said roll are not only separated from all dross and dirt and prevented from passing to the cutting and blowing mechanism, but are furthermore forced along a passage and discharged therefrom, so as to be received in a bag or other receptacle connected to the discharge end of the passage.

With the above and other incidental objects in view the invention consists of the devices and parts or their equivalents, as hereinafter set forth.

In the accompanying drawings, Figure 1 is a side elevation of the machine. Fig. 2 is an elevation of the opposite side. Fig. 3 is a longitudinal vertical sectional view with the spout broken away and showing part of the conveyer in proper position. Fig. 4 is a cross-section on the line 4 4 of Fig. 3; and Fig. 5 is a fragment of the upper part of the conveyer, showing the swinging discharge-chute in connection therewith.

Referring to the drawings, the numeral 6 indicates the lower portion or truck of the machine, which is preferably mounted on wheel 7 in order to make the machine portable. Mounted on the truck is a box-like structure or frame 8 of any desired construction best adapted for supporting the operating mechanisms and for inclosing parts of the same.

Parallel with one end of the frame and supported in suitable bearings is a drive-shaft 9. On one end of this shaft is a fly-wheel 10 and on the opposite end thereof a belt-wheel 11. Mounted fast on the drive-shaft between the ends thereof is a beveled gear-wheel 12.

The top of the frame 8 is open and is made in hopper-like form, as indicated by the numeral 13. The hopper is provided with a bottom piece 14, which extends from the rear end of the machine forwardly at a declination. It terminates short of the forward end of the machine, so as to leave an opening or passage 15 of considerable width. The front edge of this bottom piece is preferably bent downwardly on a curve, as most clearly shown in Fig. 3. This downwardly-bent portion acts as a guard to prevent cornstalks from passing in the first place directly beneath the bottom of the hopper and onto the husking portions of the rolls hereinafter referred to. The bottom piece near its front edge is provided with an elongated slot 16, in which is located a saw 17, preferably in the form of a circular saw. This saw is mounted on a shaft 18, said shaft being carried in suitable bearings and having one end extended laterally and provided with a grooved pulley 19.

Arranged longitudinally of the frame and at a desired distance below the saws and extending from the front end of the frame rearwardly at an incline are a series of husking-rollers. Any desired number of these rolls may be employed; but I prefer to employ four, as shown in the accompanying illustration. The forward ends of the rolls (indicated by the numerals 20) are the separating ends—that is to say, at these portions of the rolls the cornstalks are separated from the ears. The rear portions of the rolls (indicated by the numerals 21) are husking portions thereof. As these rolls are constructed similarly to the rolls shown and described in prior United States patents issued to me, no detail description thereof herein is deemed necessary.

The husking-rolls are rotated in the following manner: At the end of the journal of one of the rolls is a beveled gear-wheel 22, which meshes with the gear-wheel 12 on the main shaft. The opposite journals of all of the several rolls carry intermeshing gear-wheels 23. It follows that when the main shaft is rotated all of the husking-rolls are necessarily rotated.

In order to provide for the ears of corn arranging themselves singly upon the husking portions of the rolls instead of piling one upon the other, I provide two swinging or pivoted plates 24 and 25, which are mounted to swing on transverse shafts 26 and 27, respectively. To the rear of the rearmost pivoted plate is a shaft 28, having a series of radiating beater-arms 29 projecting therefrom. These beater-arms not only serve to assist the pivoted plates in causing the ears of corn to arrange themselves singly on the husking-rolls, but, furthermore, positively engage the ears of corn and force the same off the rear ends of the husking-rolls and onto the conveyer, hereinafter referred to. On one end of shaft 28 is a belt-wheel 30.

Below the forward or separating ends of the rolls is a shaft 31. On this shaft is mounted a cylinder 32, and projecting from this cylinder are a series of cutting or shredding knives 33 and a series of breakers 34. One end of this shaft has a fly-wheel 35 mounted thereon. Two flat pieces or walls 36 and 37, respectively, converge downwardly toward the cutting and shredding cylinder, and to the upper end of the wall 37 is adjustably secured a fixed knife 38. This fixed knife or cutter is so positioned that as the knives 33 are rotated with the shaft said knives will, in connection with the fixed knife, effect a shearing cut or shredding of the material. The major portion of the stalks will pass to the cutting mechanism in the passage between the wall 37 and a transverse bar 39 and will then be forced by the revolving knives and the breakers to the stationary cutter and there cut and the cut portions fall down the space between the cutter-cylinder and the wall 37. Any stalks, however, which may pass between the portions of the separating ends of the roll in advance of the passage between the partition 39 and the wall 37 will fall onto the inclined wall 36 and will slide down the same and then be carried by the revolving knives and breakers and will be similarly cut when they reach the stationary cutter, and the cut portions will then pass downwardly between the cutter-cylinder and the wall 37. By arranging the cutting and shredding mechanism as shown in the accompanying drawings and as above described—that is to say, directly beneath the separating ends of the husking-rolls—a most effective cut and shear of the cornstalks is made possible. In several of my prior United States patents I have shown the cutting and shredding mechanism adjacent to the blowing mechanism and at a considerable distance from the husking-rolls. Practice has demonstrated that this construction is open to objection in view of the fact that clogging occurs in the passages leading to the cutting mechanism and in the casing inclosing said mechanism. This difficulty is effectually obviated in my present arrangement.

Below the husking-rolls is a shaking double-bottom trough 40, which is swingingly hung on links 41 41, engaging opposite side pieces of the trough, said links pivoted at their upper ends to the fixed framework and at their lower ends to the opposite side pieces of the trough. The upper bottom piece 42 of the trough is formed with a series of projections or ribs 43 and with a series of openings 44. The lower bottom piece 45 is reticulated or perforated and is therefore in the form of a screen. A shaking or agitating motion is imparted to the trough by means of pitmen 46, connected to opposite side pieces of the trough, and one of said pitmen extending rearwardly and upwardly and connected to a wrist-pin projecting from a toothed wheel 47 on the shaft 28. The other pitman also extends rearwardly and upwardly and connects to a wrist-pin extending from the belt-wheel 30 on the opposite end of the shaft 28. It is obvious from this arrangement that when the shaft 28 is rotated a back-and-forth shaking motion is imparted to the trough 40.

The upper bottom piece 42 of the trough communicates with a chamber 48. (See dotted lines, Fig. 3.) This chamber is separated from a fan-casing 49 by an end wall, and in this end wall is an opening 50. Within the fan-casing and journaled in suitable bearings is a shaft 51, said shaft having a fan 52 mounted thereon. Extending upwardly from the fan-casing is a spout 53. This spout is preferably made of a plurality of sections, and the upper or terminal section 54 has a swivel connection with the next adjacent lower section. In the accompanying drawings I have shown the spout as consisting of two sections with a swiveled joint between the two, so that the upper bent section 54 may be swung around to different positions in order to accommodate the spout to different points of discharge. For effecting a swivel connection between the two sections of the spout I show secured to the upper end of the lower section the small bracket-arms 55, having grooves upon their inner edges, which receive flanges 56 and 57, projecting, respectively, from the upper and lower sections.

The lower bottom piece 45 of the trough communicates with a passage 58, and this passage leads to a small fan casing or chamber 59. Within this chamber is a shaft 60, and on this shaft is mounted a small fan 61. From the fan-casing 59 leads a discharge-spout 62, which spout is provided at its ends with a head 63 for convenience in attaching a bag 64 thereto.

Extending upwardly from the rear end of the machine and with its lower end in line with the rear ends of the husking-rolls is an endless conveyer-belt 65, which is of the ordinary and usual form of construction and runs between the side pieces of a frame 66. The endless sprocket-chains of the conveyer pass around sprocket-wheels 67, mounted on a shaft 68 at the lower end of the frame of the conveyer and also pass around sprocket-wheels 69, mounted on shaft 70, journaled at the upper end of the conveyer-frame. Extending downwardly from the conveyer-frame, near the upper end thereof, is an arm 71. To the outer end of this arm is pivotally connected a socket-piece 72. The socket-piece is pivotally connected to the arm 71 by a pivot-pin 73, on which is turned a nut 74. The socket of the piece 72 receives the lower reduced end of a pin 75, said pin being free to swivel or turn in the socket in which said lower reduced portion fits. To the upper end of pin 75 is pivotally connected by pivot-pin 76 a short arm 77. This short arm has a rigid connection with a trough 78. Only a fragment of this trough is shown; but it will be understood that its lower end rests on the floor or platform to which it is desired to convey the husked ears of corn, and by reason of the pivotal connection between the arm 77 and the pin 75 afforded by the pivot-pin 76 said lower end of the trough may be raised or lowered to accommodate itself to the height of the platform or flooring to which it is desired said trough should extend. The trough may also be swung around to different positions to adapt itself to particular locations by the provision of the pin 75, having a swivel connection with the socket-piece 72. The upper end of the trough may also be brought closer to or farther away from the conveyer 65 by loosening the nut 74 on the pin 73 and then turning the socket-piece 72 and again tightening the nut, when the required adjustment is obtained.

For the purpose of assisting in supporting the conveyer I provide a rope 79, connected to the rear end of the machine and extending to and connected with the frame of the conveyer.

In the drawings is shown a simple arrangement of belting for rotating the different parts of the machine. Referring to this belting, the numeral 80 indicates the main drive-belt leading from any suitable source of power and extended to and around the large pulley 11 on the main drive-shaft. It is then extended forwardly and around a small pulley 81 on the shaft 31, which carries the cutting and shredding mechanism, and thence forwardly and around a small pulley 82 on the fan-shaft 51 and thence back to the source of power. It will be seen from the foregoing that the belt 80 operates the drive-shaft 9, the cutter-shaft 31, and the fan-shaft 51. For operating the shaft 18, carrying the band-severing mechanism, and the shaft 28, carrying the beater-arms 29, I employ a belt 83, which passes around a pulley 84 on the main shaft and is then extended rearwardly and around pulley 30 on shaft 28, thence forwardly and around pulley 19 on shaft 18, thence rearwardly around a small pulley 85, mounted on a stud 86, projecting from a plate 87, and is then continued forwardly back to the pulley 84. The plate 87 is adjustable longitudinally in order to take up slack in the belt, and this is provided for by employing two set-screws 88 88, extending through elongated slots 89 89 in the plate and entering the framework. By loosening the set-screws the plate may be readily adjusted longitudinally and any slack in the belt thereby compensated for.

For imparting motion to the belt of the endless conveyer 65 I mount on the lower shaft 18 of said conveyer a sprocket-wheel 90. Around this wheel passes a sprocket-chain 91. This chain is extended to and around a sprocket-wheel 92, mounted on a short stud 93, projecting laterally from the framework. This stud also carries a toothed wheel 94, and this toothed wheel is in mesh with the toothed wheel 47 on the shaft 28. It will be evident from the foregoing that when the shaft 28 is rotated the endless conveyer, through the described connection, is actuated. For rotating the fan 61 I mount on the shaft 60 thereof a pulley 95, and this pulley is connected up to a similar pulley 96 on the shaft 31 by means of a rope belt 97. When rotation is imparted to shaft 31, this rotation is transferred to shaft 60 by means of the belt 97, passing around the pulleys just referred to. The belt 97 is preferably a rope belt, and the other belts shown in the drawings and described in the specification may be of a similar character wherever it is practicable to substitute the same for flat belts.

In the operation of the invention rotation is imparted to the several rotatable portions of the mechanism in the manner hereinbefore fully pointed out. Tied bundles of cornstalks are fed into the hopper with the ears of corn pointing toward the rear of the machine. The rotation of the saw 17 will effect the cutting of the bands or cords of the bundles and at the same time tend to thrust the bundles downward through the throat or passage 15 with the ears of corn uppermost. The cornstalks are then pulled between the separating ends of the rolls and the ears of corn are snapped off the stalks in the manner common to this form of machinery. The ears so severed from the stalks are of course left on the top surfaces of the husking-rolls and slide down said rolls, but before leaving the rear ends thereof are stripped of their husks, said husks passing between the rolls and dropping onto the upper bottom piece 42 of the shaking trough. The ears of corn, stripped of their husks, slide off the rear ends of the rolls onto the conveyer and are carried thereby to a place of deposit. The cornstalks which pass between the separating ends of the rolls are immediately acted upon by the cutting and shredding mechanism and the cut portions deposited on the upper bottom piece 42 of the shaking trough. The trough being subjected to a continual shaking motion or agitation, the cut and shredded stalks, by reason of the peculiar formation of the projections 43, are forced forwardly and into the passage 48, thence through the opening 50 and into the fan-casing, where they are acted upon by the fan and forced upwardly in the conduit 53 to the place of deposit. Any dross or dirt which may pass downwardly with the cut cornstalks and fall onto the upper bottom piece 42 is, through the shaking motion imparted to the trough, caused to pass through the openings 44 in said bottom piece and fall onto the lower perforated bottom piece 45 and through the perforations thereof to the ground. In this way dirt, dross, or other foreign matter is prevented from being carried into the fan-casing with the cut and shredded cornstalks. The husks which are stripped from the ears of corn and pass between the rolls at the husking portions of said rolls also drop onto the upper bottom piece 42 and are forced forwardly and into the fan-casing and thence upwardly in the conduit.

If in the operation of husking any corn should be shelled from the ears and pass between the rolls, said shelled corn will fall onto the upper bottom piece 42 and thence through the openings 44 thereof and onto the lower bottom piece 45. This bottom piece is on a slight declination toward the forward end of the machine, and the kernels of corn will therefore, by reason of the shaking motion or agitation imparted to the trough, be carried forwardly and into the passage 58, thence into the fan-casing 59, where they are acted upon by the fan 61 and forced upwardly in the conduit 62, and finally discharged therefrom into the bag 64.

I prefer to employ in connection with the belt 83 and in addition to the manually-operated belt-tightening mechanism 85 87 an automatically-operating tightener. This consists of a pivoted arm 98, carrying at its free end a pulley 99, which bears against the belt 83. To the arm 98 is connected a rope or cable 100. This rope or cable is extended upwardly and over a grooved roller 101 and then extends downwardly and carries at its lower end a weight 102. It is evident that this mechanism will act to automatically take up slack in the belt referred to.

In view of the fact that the openings of the upper bottom piece 42 of the trough are quite coarse, light leaves will pass therethrough, and inasmuch as the fan 52 when the machine is in operation is rapidly revolved a powerful suction is created, which draws said leaves from the space between the upper and lower bottom pieces 42 and 45 into the chamber 48 and thence into the fan-casing, where they are acted upon by the fan and forced up the conduit, together with the other fodder. The shelled kernels of corn, however, which pass through the openings 44, are heavy enough to resist the suction and are not drawn from the space between the two bottom pieces and into the chamber 48, but pass along the passage 58 and are acted upon by the fan 61 in the manner hereinbefore set forth. It will therefore be seen that by this arrangement the kernels of corn are discharged from the machine free from all dirt and dross, which, as previously stated, escapes through the perforations of the lower bottom piece 45, and also free from all small leaves and other light substances.

What I claim as my invention is—

1. In a corn-husking machine, the combination of a frame, a double-bottom shaking trough mounted in said frame, the upper bottom piece thereof provided with a series of openings, and the lower bottom piece being in the form of a screen, and two fan mechanisms, the casing of one of said mechanisms being in communication with one end of the upper bottom piece of the trough, and the casing of the other fan mechanism being in communication with one end of the lower bottom piece of the trough.

2. In a corn husker and shredder, the combination of a frame, rotatable husking-rolls arranged therein and adapted for separating the stalks from the ears and for husking the ears, the said stalks and husks passing between the rolls, cutting and shredding mechanism acting on the stalks passing between the rolls, a shaking trough located below the rolls and provided with a double bottom, the upper bottom piece provided with a series of openings, and the lower bottom piece being in the form of a screen, the said upper bottom piece receiving the cornstalks and the husks thereon, a chamber with which one end of the upper bottom piece of the trough communicates, a fan-casing with which said chamber communicates, a rotatable fan in said casing, a conduit leading from the casing, another fan-casing having a passage extending therefrom and communicating with one end of the lower perforated bottom piece, a rotatable fan in the latter fan-casing, and a conduit leading from said latter fan-casing.

In testimony whereof I affix my signature in presence of two witnesses.

AUGUST ROSENTHAL.

Witnesses:
ANNA F. SCHMIDTBAUER,
A. L. MORSELL.